US006934061B2

(12) United States Patent
Ono et al.

(10) Patent No.: US 6,934,061 B2
(45) Date of Patent: Aug. 23, 2005

(54) OPTICAL SCANNER AND IMAGE REPRODUCING APPARATUS

(75) Inventors: Nobuaki Ono, Kanagawa (JP); Yoshinori Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 168 days.

(21) Appl. No.: 10/642,173

(22) Filed: Aug. 18, 2003

(65) Prior Publication Data

US 2004/0141219 A1 Jul. 22, 2004

(30) Foreign Application Priority Data

Aug. 28, 2002 (JP) ........................................ 2002-248130

(51) Int. Cl.[7] .............................................. G02B 26/08
(52) U.S. Cl. .................... 359/204; 359/216; 347/243
(58) Field of Search ................... 359/204, 216–219, 359/205–207; 347/243, 244, 232

(56) References Cited

U.S. PATENT DOCUMENTS

| | | | | |
|---|---|---|---|---|
| 5,251,055 A | * | 10/1993 | Koide | 359/216 |
| 6,088,146 A | * | 7/2000 | Takeshita et al. | 359/204 |
| 6,342,963 B1 | * | 1/2002 | Yoshino | 359/204 |
| 6,462,853 B2 | | 10/2002 | Hayashi et al. | |
| 6,509,995 B1 | | 1/2003 | Suzuki et al. | |
| 6,573,921 B2 | | 6/2003 | Hayashi et al. | |
| 6,587,245 B2 | | 7/2003 | Hayashi et al. | |
| 6,606,179 B2 | | 8/2003 | Suzuki et al. | |
| 6,621,512 B2 | | 9/2003 | Nakajima et al. | |

FOREIGN PATENT DOCUMENTS

| | | |
|---|---|---|
| JP | 9-58053 | 3/1997 |
| JP | 9-127443 | 5/1997 |
| JP | 2001-350110 | 12/2001 |

* cited by examiner

*Primary Examiner*—James Phan
(74) *Attorney, Agent, or Firm*—Oblon, Spivak, McClelland, Maier & Neustadt, P.C.

(57) ABSTRACT

An optical scanner includes at least a pair of optical scanning systems and a light deflector used in common between the optical scanning systems, each optical scanning system having a scan lens for guiding the beam deflected from the light deflector onto the associated scanned plane. One of the optical scanning systems has a first reference reflecting position on the light deflector, and the other optical scanning system has a second reference reflecting position on the light deflector. The first and second reference reflecting positions are asymmetric with respect to the reference plane of the optical scanner. The scan lenses of said pair of optical scanning systems are arranged to be symmetric with respect to a line passing through the rotational center of the light deflector and extending in parallel to the scanned planes.

9 Claims, 9 Drawing Sheets

FIG.2A

| PLANE # | Rm (mm) | Rs(0) (mm) | X (mm) | N | NOTE |
|---|---|---|---|---|---|
| LS | – | – | 0.421 | – | Semiconductor Laser |
| 1 | ∞ | ∞ | 0.3 | 1.514 | Cover Glass |
| 2 | ∞ | ∞ | 12.0 | 1.514 | Cover Glass |
| 3* | 52.6 | 52.6 | 3.8 | 1.514 | Coupling Lens |
| 4* | −8.71 | −8.71 | 28.5 | 1.514 | Coupling Lens |
| 5 | ∞ | 64.5 | 3.0 | 1.514 | Cylindrical Lens |
| 6 | ∞ | ∞ | 124.3 | 1.514 | Cylindrical Lens |
| 7 | – | – | – | – | Deflecting/Reflecting Plane |

Asterisked planes are coaxial aspherical surfaces.

FIG.2B

| PLANE # | Rm (mm) | Rs(0) (mm) | X (mm) | N | NOTE |
|---|---|---|---|---|---|
| LS | – | – | 0.421 | – | Semiconductor Laser |
| 1 | ∞ | ∞ | 0.3 | 1.514 | Cover Glass |
| 2 | ∞ | ∞ | 12.0 | 1.514 | Cover Glass |
| 3 * | 52.6 | 52.6 | 3.8 | 1.514 | Coupling Lens |
| 4 * | -8.71 | -8.71 | 28.5 | 1.514 | Coupling Lens |
| 5 | ∞ | 64.5 | 3.0 | 1.514 | Cylindrical Lens |
| 6 | ∞ | ∞ | 124.3 | 1.514 | Cylindrical Lens |
| 7 | – | – | – | – | Deflecting/Reflecting Plane |

Asterisked planes are coaxial aspherical surfaces.

FIG.3A

| PLANE # | Rm (mm) | Rs(0) (mm) | X (mm) | N | NOTE |
|---|---|---|---|---|---|
| Deflection Plane | ∞ | ∞ | 52.0 (L1) | – | Polygon Mirror |
| 1 * | -312.6 | -312.6 | 31.4 (d1) | 1.527 | Scan Lens 1 |
| 2 * | -83.0 | -83.0 | 78.0 (L2) | 1.527 | Scan Lens 1 |
| 3 ** | -500 | -47.7 | 3.5 (d2) | 1.527 | Scan Lens 2 |
| 4 | -1000 | -23.38 | 142.3 (L3) | 1.527 | Scan Lens 2 |
| 5 | – | – | – | – | Scanned Plane |

FIG.3B

| PLANE # | Rm (mm) | Rs(0) (mm) | X (mm) | N | NOTE |
|---|---|---|---|---|---|
| Deflection Plane | ∞ | ∞ | 52.0 (L1) | — | Polygon Mirror |
| 1 * | −312.6 | −312.6 | 31.4 (d1) | 1.527 | Scan Lens 1 |
| 2 * | −83.0 | −83.0 | 78.0 (L2) | 1.527 | Scan Lens 1 |
| 3 ** | −500 | −47.7 | 3.5 (d2) | 1.527 | Scan Lens 2 |
| 4 | −1000 | −23.38 | 142.3 (L3) | 1.527 | Scan Lens 2 |
| 5 | — | — | — | — | Scanned Plane |

| IMAGE HEIGHT (mm) | FAST SCAN DOT OFFSET (mm) | |
|---|---|---|
| | SCAN LENS SYMMETRIC ARRANGEMENT | SCAN LENS ASYMMETRIC ARRANGEMENT |
| 150.5 | 0.00023 | 0.00114 |
| 100.0 | 0.00030 | 0.00188 |
| 50.0 | 0.00029 | 0.00126 |
| 0.0 | 0.00000 | 0.00000 |
| -50.0 | -0.00003 | 0.00006 |
| -100.0 | 0.00049 | 0.00290 |

OPTICAL SCANNER AND IMAGE REPRODUCING APPARATUS

BACKGROUND OF THE INVENTION

1. Field of the Invention

The present invention relates to an optical scanner used in an image reproducing apparatus, such as a digital photocopy machine or a laser printer, and to an image reproducing apparatus using such an optical scanner.

2. Description of the Related Art

To increase the image reproduction speed in an image reproducing apparatuses, such as digital photocopy machines or laser printers, an optical scanner that has a common light deflector arranged between pairs of scanned planes in order to guide the beams onto the scanned planes located on both sides of the common deflector has been conventionally known. With such an optical scanner, optical scanning is carried out along the multiple scanned planes simultaneously. For instance, exposure can be performed simultaneously for four colors (yellow, magenta, cyan and black), and consequently, a color image can be reproduced quickly.

Another type of known optical scanner increases the rotating rate of the light deflector to increase the scanning rate on the scanned plane in order to realize high-speed image reproduction.

Still another type of known optical scanner uses a light deflector (e.g., a polygon mirror) having an increased number of facets (as deflecting reflection planes) to increase the image reproduction speed, without changing the rotating rate.

When using the optical scanner with the scanned planes arranged on both sides of the optical deflector, the light beams used to illuminate the scanned planes have to be received at beam detectors prior to the optical writing for the purpose of synchronization of writing start timing. If the light deflector is shared between a pair of optical scanning systems, the scanned planes located on both sides of the light deflector are optically scanned by the beams in directions opposite to each other with the writing start positions inverted. For this reason, the beam detector of one optical scanning system has an inverse arrangement with respect to that of the other optical scanning system located on the opposite side of the light deflector. This arrangement makes it difficult to maintain the required scan width unless the area size of each reflection facet of the light deflector is increased. However, when the reflection facet is made larger, a large-sized motor is required to rotate the light deflector. This causes noise, vibration, power consumption, and cost to be increased.

The same problem occurs in the arrangement of increasing the rotation rate of the light deflector, causing noise, vibration, power consumption, and cost to be increased.

In the arrangement for increasing the number of facets of the light deflector, each reflecting surface of the light deflector has to be made large in order to guarantee the necessary scan width. This also causes the above-described problems, that is, increased noise, vibration, power consumption, and cost. In addition, since the distance from the rotational center to each reflecting surface becomes long, the sag (difference in position of reflection point depending on angle of view) becomes large, and consequently, the optical characteristics (such as curvature of field and linearity) are degraded.

Some techniques for increasing the image reproduction rate without increasing the revolution rate of the light deflector have been proposed, which are all applied to the optical scanner with the scanned planes arranged on both sides of a common light deflector.

For example, JPA 9-58053 discloses a technique for correcting color misalignment among multiple scanned planes. In this technique, multiple beams are produced, and each beam is detected on the writing starting side and the writing ending side using beam detectors. The clock frequency of each beam is adjusted so as to correct the color misalignment.

Another publication, JPA 9-127443, proposes to set the incident angles of the beams incident on a common light deflector differing from each.

Still another publication, JPA 2001-350110, proposes to arrange a pair of optical scanning systems asymmetrically with the incident positions thereof offset from each other. This arrangement aims to maintain the effective writing range in common between multiple scanned planes, while providing beam detection areas for placing the light-receiving means, without increasing the size of the deflecting/reflecting surface of the light deflector.

However, the technique disclosed in JPA 9-58053 requires spaces for placing the light receiving means (or beam detectors) near the writing start position and the writing end position. Accordingly, it becomes difficult for this technique to provide the required scanning width.

With the technique disclosed in JPA 9-127433, the lens systems before the deflector have to be arranged differently from each other in order to make the incident angles of the beams onto the deflector differing from each other. Accordingly, the layout of the optical scanning systems becomes difficult.

With the technique disclosed in JPA 2001-127443, because the optical scanning systems are arranged asymmetrically on the right side and the left side of the light deflector, with the incident positions differing from each other, dot positions are offset in the fast scan direction.

SUMMARY OF THE INVENTION

Therefore, it is an object of the present invention to overcome the problems in the prior art techniques, and to provide an optical scanner and an image reproducing apparatus that include multiple optical scanning systems and a common light deflector, and that can reduce the dot offset in the fast scan direction, while providing the effective writing range and the beam detection spaces for the respective optical scanning systems.

To achieve the object, in one aspect of the present invention, an optical scanner having at least a pair of optical scanning systems and a light deflector used in common between the optical scanning systems is provided. Each of the optical scanning systems has a scan lens for guiding the beam deflected from the light deflector onto an associated scanned plane. One of said pair of optical scanning systems has a first reference reflecting position on the light deflector, and the other optical scanning system has a second reference reflecting position on the light deflector, the first and second reference reflecting positions being asymmetric with respect to a reference plane that contains the rotational axis of the light deflector and extends parallel to the scanned planes. The scan lenses of said pair of optical scanning systems are arranged to be symmetric with respect to a line passing through the rotational center of the light deflector and extending parallel to the scanned planes.

By arranging the scan lenses of the optical scanning system to be symmetric with respect to the line passing through the rotational axis of the light deflector and extending parallel to the scanned planes of the optical scanning systems, dot offset in the fast scan direction can be reduced.

By arranging the reference reflecting positions of the optical scanning systems asymmetric with respect to the reference plane of the optical scanner, a sufficient amount of effective writing range can be maintained, while providing detection areas for the respective optical scanning systems.

One of said pair of optical scanning systems has a first writing start position located on the positive image-height side of the optical scanner, and the other optical scanning system has a second writing start position located on the negative image-height side of the optical scanner. The second reference reflecting position is positioned on a more positive side than the first reference reflecting position.

The scan lens of each of said pair of optical scanning systems is arranged so that the optical axis of the scan lens is offset from the associated reference reflecting position in the positive direction.

In another aspect of the invention, an image reproducing apparatus using the above-described optical scanner is provided, the image reproducing apparatus including multiple photosensitive units on which multiple light beams guided by the optical scanner scan. Each of the optical scanning systems of the optical scanner is provided corresponding to one of the photosensitive units. The optical scanning systems comprise at least a pair of optical scanning systems, each system having a scan lens for guiding the light beam onto the associated photosensitive unit having a scanned surface. One of said pair of optical scanning system has a first reference reflecting position on the light deflector, and the other optical scanning system has a second reference reflecting position on the light deflector. The first and second reference reflecting positions are asymmetric with respect to the reference plane of the optical scanner. The scan lenses of said pair of optical scanning systems are arranged to be symmetric with respect to a line passing through the rotational center of the light deflector and extending parallel to the scanned planes.

BRIEF DESCRIPTION OF THE DRAWINGS

Other objects, features, and advantages of the present invention will become more apparent from the following detailed description when read in conjunction with the accompanying drawings, in which:

FIG. 2A and FIG. 2B illustrate the data of the optical scanning systems A and B, respectively, used in the optical scanner shown in FIG. 1, as to the elements from the light source to the light deflector arranged along the respective optical paths of the systems;

FIG. 3A and FIG. 3B illustrate the optical characteristics of the optical scanning systems A and B, respectively, used in the optical scanner shown in FIG. 1, as to the elements from the light deflector to the scanned plane arranged along each of the optical paths of the systems;

DETAILED DESCRIPTION OF THE EMBODIMENTS

The preferred embodiments of the invention are described below with reference to the attached drawings.

Figure 1A:
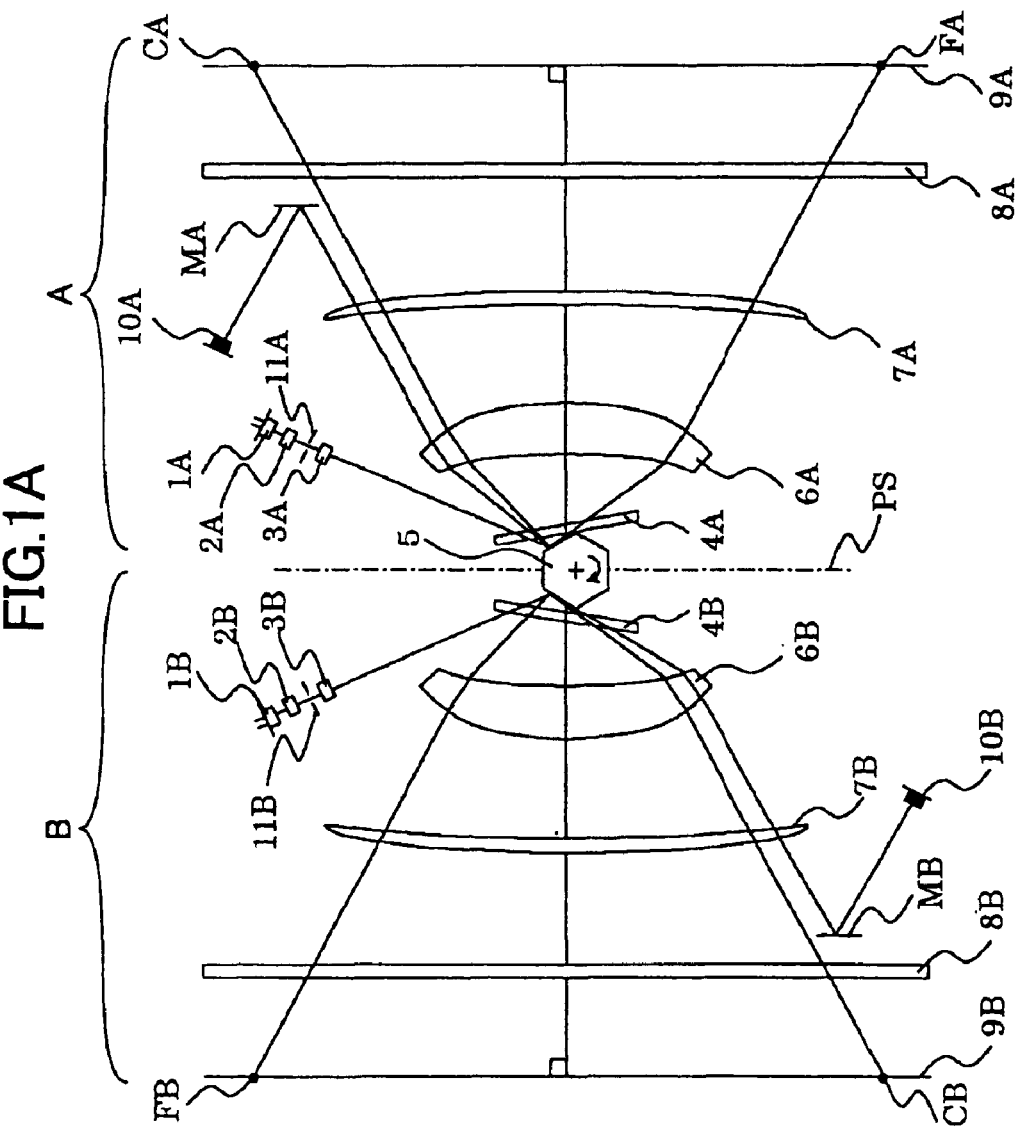
FIG. 1A illustrates a layout of the optical scanner according to an embodiment of the invention.
Figure 1B:
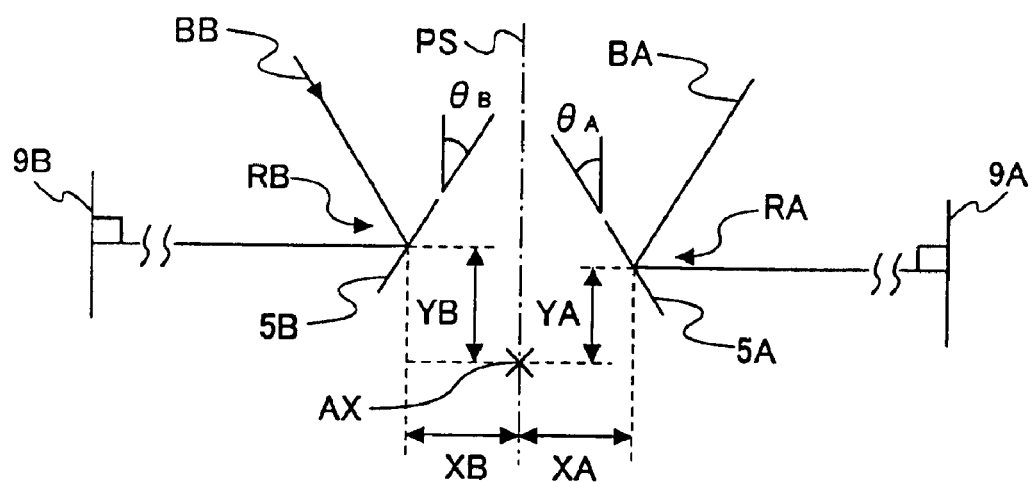
FIG. 1B illustrates the reflection points on the deflecting reflection planes of the deflector and in its vicinity.

FIG. 1A illustrates a layout of the optical scanner, which is developed in a plane perpendicular to the rotational axis of the light deflector, and FIG. 1B illustrates the reflecting points on the deflecting/reflecting surfaces of the light deflector and in their vicinity.

As illustrated in FIG. 1A, the optical scanner is comprised of optical scanning systems A and B.

The optical scanner includes semiconductor lasers 1A and 1B, which are used as the light sources, coupling lenses 2A and 2B, cylindrical lenses 3A and 3B, beam-shaping apertures 11A and 11B, soundproof glass panes 4A and 4B, a light deflector 5, first scan lenses 6A and 6B, second scan lenses 7A and 7B, dust-proof glass panes 8A and 8B, scanned planes (photosensitive members) 9A and 9B, light-receiving devices (photodetectors) 10A and 10B, and mirrors MA and MB. The mirror MA and the light-receiving device 10A form light-receiving means for the scanned plane 9A. Similarly, the mirror MB and the light-receiving device 10B form light-receiving means for the scanned plane 9B.

The light deflector 5 is shared between the optical scanning systems A and B, each of which comprises the above-described respective components.

The light deflector 5 is, for example, a polygon mirror, which is rotated by a driving mechanism (not shown) at a constant speed in the direction shown by the arrow.

The light deflector 5 is accommodated in a soundproof housing (not shown) that has windows for allowing the light beams to pass through. The windows are covered with the soundproof glass panes 4A and 4B that are parallel plates made of transparent glass.

Although not shown in FIG. 1A, a light-path bending mirror is placed between the light deflector 5 and the scanned plane 9A, and between the light deflector 5 and the scanned plane 9B.

Although a single light source is used in each of the optical scanning systems A and B in the example shown in FIG. 1A, multiple light sources may be used in each of the optical scanning systems.

In the example shown in FIG. 1A, a single pair of optical scanning systems are used with the light deflector 5 positioned between them. However, multiple pairs of optical scanning systems may be arranged in the slow scan direction at a prescribed interval.

The two optical scanning systems A and B are arranged on either side (one on each side) of the light deflector 5 so that the fast scan directions of the light beams deflected by the light deflector 5 become substantially parallel to each other. The light beam emitted from the semiconductor laser 1A strikes the light deflector 5, and is reflected from the deflecting/reflecting surface of the light deflector 5 to the right-hand side of the paper toward the scanned plane 9A. The light beam emitted from the semiconductor laser 1B is reflected from the deflecting/reflecting surface of the light deflector 5 to the left-hand side of the paper toward the scanned plane 9B. These two light beams scan the respective photosensitive members 9A and 9B in the fast scan directions. The fast scan directions along the respective photosensitive members 9A and 9B are substantially parallel to each other.

The direction in which each of the light beams emitted from the semiconductor lasers 1A and 1B, respectively, is deflected by the light deflector 5 is referred to as the fast scan direction. The slow scan direction is a direction perpendicular to the fast scan direction.

The reference plane PS is a virtual plane that includes the rotational axis of the light deflector 5 and extends parallel to the scanned planes 9A and 9B.

The divergent light fluxes emitted from the semiconductor lasers 1A and 1B pass through the coupling lenses 2A and 2B, respectively, which convert the light fluxes into beam forms suitable for the subsequent lens systems. The light beams converted by the coupling lenses 2A and 2B have the same form, which may be parallel or collimated beams, or alternatively, convergent or divergent beams.

The light beams having passed through the coupling lenses 2A and 2B are shaped by the apertures 11A and 11B, respectively. For example, the apertures 11A and 11B block the peripheral portions of the light beams. The shaped light beams pass through the cylindrical lenses 3A and 3B, respectively, which are focusing lenses having a positive power only in the slow scan direction, and focus on or near the deflecting/reflecting surfaces of the light deflector, forming line images extending in the fast scan directions.

The light beams deflected by the light deflector 5 pass through the first scan lenses 6A and 6B, second scan lenses 7A and 7B, and dust-proof glass panes 8A and 8B that are a part of the casing of the optical scanner, respectively, and finally focus on the photosensitive members, forming light spots on the scanned planes 9A and 9B. The light spots scan along the scanned planes 9A and 9B at a substantially constant speed.

The light path extending from the semiconductor laser 1A to the light deflector 5 and the light path extending from the semiconductor laser 1B to the light deflector 5 are substantially symmetric with respect to the reference plane PS.

The light beams being guided onto the scanned planes 9A and 9B are reflected by the mirrors MA and MB, prior to starting the writing operation, and detected by the light-receiving devices 10A and 10B, respectively.

The optical scanning systems A and B use the light-receiving signals (or detection signals) produced by the light-receiving devices 10A and 10B, respectively, as reference signals. The optical scanning systems A and B start writing at writing start positions CA and CA after a prescribed time from the generation of the detection signals, and finish writing at the writing end positions FA and FB, respectively.

Next, explanation is made of the reference reflecting positions of the scanning optical systems.

In FIG. 1B, the light beam BA emitted from the semiconductor laser 1A is deflected by the deflecting/reflecting surface 5A of the light deflector, and the light beam BB emitted from the semiconductor laser 1B is deflected by the deflecting/reflecting surface 5B of the light deflector 5.

It is assumed that the principal ray of the light beam BA deflected by the deflecting/reflecting surface 5A is perpendicular to the scanned plane 9A when the deflecting/reflecting surface 5A makes angle $\theta_A$ with respect to the reference plane PS. (It should be noted that the effects of the scan lenses 6A and 6B are not taken into account). Under this condition, the position at which the principal ray of the light beam BA is reflected from the deflecting/reflecting surface 5A is the "reference reflecting position for the light beam BA", which is denoted by symbol "RA".

Similarly, it is assumed that the principal ray of the light beam BB deflected by the deflecting/reflecting surface 5B is perpendicular to the scanned plane 9B when the deflecting/reflecting surface 5B makes angle $\theta_B$ with respect to the reference plane PS. Under this condition, the position at which the principal ray of the light beam BB is reflected from the deflecting/reflecting surface 5B is the "reference reflecting position for the light beam BB", which is denoted by symbol "RB".

The reference reflecting positions RA and RB are defined with respect to the rotational axis AX of the light deflector 5, as illustrated in FIG. 1B. That is, the reference reflecting position RA is separated from the rotational axis AX by a distance XA in a direction perpendicular to the reference plane PS and to the rotational axis AX, and by a distance YA in a direction parallel to the reference plane PS and perpendicular to the rotational axis AX.

The positive and negative directions of the reference plane RS are determined with respect to the rotational axis AX. The writing starting position of the optical scanning system A is on the positive side, and that of the optical scanning system B is on the negative side.

Next, the optical characteristics of the optical writing systems according to an embodiment of the invention are explained using numerical values. Each pair of optical components used in the optical scanning systems A and B is made of the same lenses. However, the arrangement of the optical components in the optical scanning system A is slightly different from that in the optical scanning system B because the reference reflecting positions RA and RB are asymmetric with respect to the reference plane PS. Accordingly, numerical data of the optical scanning systems A and B are given separately.

FIG. 2A is a table showing numerical data of the optical components from the light source to the light deflector 5 in the optical scanning system A, and FIG. 2B is a table showing numerical data of the optical components from the light source to the light deflector in the optical scanning system B.

Symbol Rm denotes the radius of curvature in the meridional (fast scan) direction, Rs denotes the radius of curvature in the sagital (slow scan) direction, N denotes the index of refraction at the wavelength used in the system, and X denotes the distance in the direction along the optical axis.

The wavelength of the semiconductor lasers 1A and 1B is 655 nm.

"Semiconductor laser" shown in each of the tables of FIGS. 2A and 2B corresponds to one of the semiconductor lasers 1A and 1B, "cover glass" in each table corresponds to the cover glass (not shown in FIG. 1A) of one of the semiconductor lasers 1A and 1B, "coupling lens" corresponds to one of the coupling lenses 2A and 2B, and "cylindrical lens" corresponds to one of the cylindrical lenses 3A and 3B.

Each of the soundproof glass panes 4A and 4B (see FIG. 1A) is a parallel plate with a thickness of 1.9 mm and an index of refraction of 1.514, which is arranged at an angle of 8 degrees with respect to the reference plane PS.

The light deflector 5 has a polygonal shape with six facets (reflecting surfaces), and the distance from the rotational center AX to the reflecting surfaces (that is, the radius of the inscribed circle) is 18 mm. The effective reflecting area of each deflecting/reflecting surface is the area defined by sides 2 mm inside the edges of the surface.

The asterisked planes (that is, the incident surface and the exit surface of each of the coupling lenses 2A and 2B) are coaxial aspherical surfaces. Although the numerical values are not shown, the wave front aberrations of the coupling lenses 2A and 2B are appropriately corrected.

The light beams exiting the coupling lenses 2A and 2B are "parallel beams".

Angle $\theta_A$ and angle $\theta_B$ are set to 30 degrees ($\theta_A=\theta_B=30°$), and the incident angles of the light beams BA and BB onto the deflecting/reflecting surfaces 5A and 5B, respectively, are 28.45 degrees. The position of the reference reflecting surface RA is defined by distances XA and YA from the rotational axis of the light deflector 5, where XA is 16.50 mm and YA is 7.42 mm. The position of the reflecting surface RB is defined by distances XB and YB, where XB is 16.29 mm and YB is 7.78 mm.

Since there are differences between XA and XB (XA−XB=0.21 mm) and between YA and YB (YB−YA=0.36 mm), the reference reflecting positions RA and RB are slightly asymmetric in two dimensions with respect to the reference plane PS.

In addition, since YB is greater than YA (YA<YB), the reference reflecting position RB on the deflecting surface located on the side of scanned plane 9B is positioned in a more positive direction than the reference reflecting position RA on the deflecting surface located on the side of scanned plane 9A.

FIG. 3A is a table showing numerical data of the optical components arranged after the light deflector 5 in the optical scanning system A, and FIG. 3B is a table showing numerical data of the optical components arranged after the light deflector 5 in the optical scanning system B.

In the optical scanning system A, the distance from the reference reflecting position RA of the deflecting/reflecting surface 5A to the incident surface of the scan lens 6A is 52.0 mm. Similarly, in the optical scanning system B, the distance from the reference reflecting position RB of the deflecting/reflecting surface 5B to the incident surface of the scan lens 6B is 52.0 mm.

Figures 4, 5:
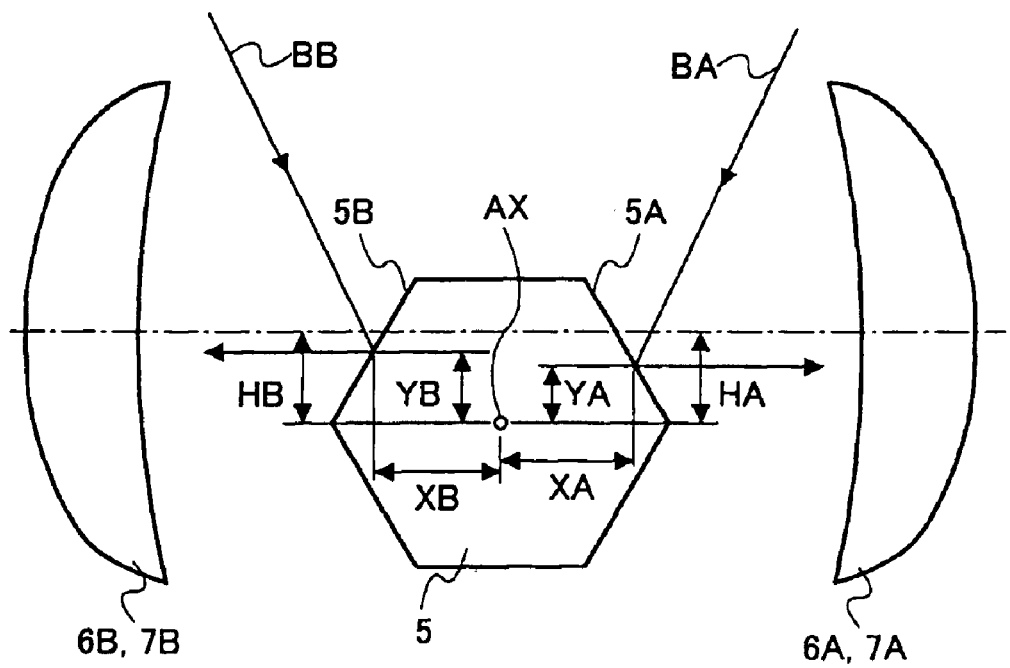
FIG. 4 is a table showing the relation between the image height and the dot offset in the fast scan direction of the optical scanner according to an embodiment of the invention.
FIG. 5 is a diagram used to explain the distance from the rotational center of the light deflector used in the optical scanner shown in FIG. 1 to the vertex of a scan lens, extending in the fast scan direction.

FIG. 4 is a table showing the relation between the image height and the dot offset in the fast scan direction. The relation is indicated for a symmetric arrangement in which the scan lenses of the optical scanning systems A and B are arranged so as to be symmetric with respect to a line passing through the rotational center of the light deflector 5 and extending parallel to the scanned planes, and for an asymmetric arrangement in which the scan lenses of the optical scanning systems A and B are arranged so as to be asymmetric with respect to the same line.

The separations in the fast scan direction between the rotational center (located on the rotational axis AX) of the light deflector 5 and the vertexes of the scan lenses 6A, 7A, 6B, and 7B are denoted by HA1, HA2, HB1, and HB2, respectively. FIG. 5 illustrates separations HA and HB in the fast scan direction between the rotational center AX of the light deflector 5 and the vertexes of the scan lenses 7A, 7A and 6B, 7B of the optical scanning systems A and B, respectively.

With the symmetric arrangement of the scan lenses, HA1, HB1, HA2, and HB2 are set as follows:
HA1=9.0 mm
HB1=9.0 mm
HA2=9.1 mm
HB2=9.1 mm.

With the asymmetric arrangement of the scan lenses, HA1, HB1, HA2, and HB2 are set as follows:
HA1=10.0 mm
HB1=9.0 mm
HA2=10.1 mm
HB2=9.1 mm.

From the table shown in FIG. 4, it is understood that dot offset in the fast scan direction can be reduced both to the left and to the right when the scan lenses of the optical scanning systems A and B are arranged to be symmetric with respect to a line passing through the rotational center of the light deflector 5 and extending parallel to the scanned planes, as compared to the asymmetric arrangement.

When angles $\theta_A$ and $\theta_B$ are set to 30 degrees ($\theta_A=\theta_B=30°$), separations YA an YB in the fast scan direction from the rotational center of the light deflector 5 to the reference reflecting positions RA and RB become as follows:
YA=7.42 mm
YB=7.78 mm.

With the symmetric arrangement in which the scan lenses of the optical scanning systems A and B are symmetric with respect to the line passing through the rotational center of the light deflector 5 and extending parallel to the scanned planes, separations in the fast scan direction from the rotational center of the light deflector 5 to the vertexes of the scan lenses become as follows:
HA1=HB1=9.0 mm
HA2=HB2=9.1 mm.

Consequently, the following relations stand.
YA<HA1
YA<HA2
YB<HB1
YB<HB2

The optical axes of the scan lenses 6A and 7A of the optical scanning system A are offset from the reference reflecting position RA toward the semiconductor laser 1A. The optical axes of the scan lenses 6B and 7B of the optical scanning system B are also offset from the reference reflecting position RB toward the semiconductor laser 1B. In other words, the scan lenses 6A and 7A of the optical scanning system A are positioned so that the optical axes thereof are located closer to the semiconductor laser 1A than is the reference reflecting position RA. The same applies to the scan lenses 6B and 7B of the optical scanning system B.

In FIG. 3A and FIG. 3B, the single asterisked planes are coaxial aspherical surfaces. The distance X in the direction of the optical axis is expressed by equation (1).

$$X = Y^2/R[1 + (1 - (1+K)(Y/R)2)^{1/2}] + \\ A*Y^4 + B*Y^6 + C*Y^8 + D*Y^{10} \quad (1)$$

For plane number 1 of FIG. 3A and FIG. 3B (that is, the incident surfaces of the scan lenses 6A and 6B), the constants used in equation (1) are set as follows.

K=2.667
A=1.79E−07
B=−1.08E−12
C=−3.18E−14
D=−3.74E−18

For plane number 2 of FIG. 3A and FIG. 3B (that is, the exit surfaces of the scan lenses 6A and 6B), the constants are set as follows.
K=0.02
A=2.50E−07
B=9.61E−12
C=4.54E−15
D=−3.03E−18

The planes denoted by double asterisks (**) have non-arched shapes in the fast scan direction, and the radius of curvature along the slow scan direction varies continuously in the fast scan direction.

For plane number 3 (that is, the incident surface of the scan lenses 7A and 7B), the constants are set as follows.
K=71.73
A=4.33E−08
B=−5.97E−13
C=−1.28E−16
D=5.73E−21

The relation between the radius of curvature Rs(Y) in the slow scan direction expressed using a variable Y that is the distance from the optical axis in the slow scan direction and the curvature Cs(Y) is expressed by equation (2).

$$Cs(Y)=(1/Rs(0))+\Sigma bj*Y^j \quad (j=1, 2, \ldots) \quad (2)$$

where plane number 3 is symmetric in the fast scan direction with respect to the optical axis, and the constants used in equation (2) are set as follows.
Rs(0)=−47.7
b2=1.60E−03
b4=−2.32E−07
b6=1.60E−11
b8=−5.61E−16
b10=2.18E−20
b12=−1.25E−24

Figure 6A:
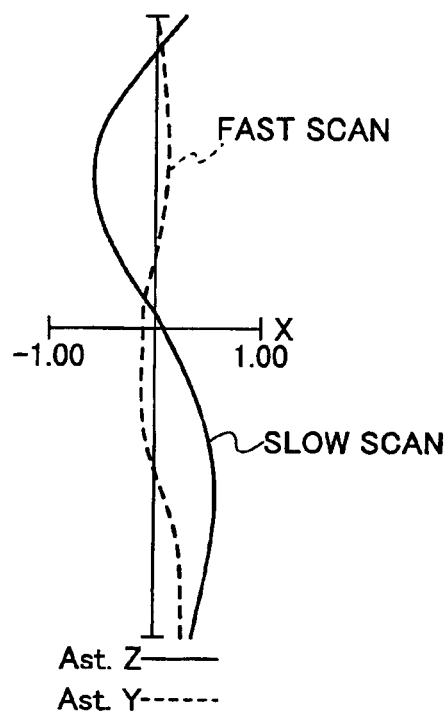
FIG. 6 illustrates the optical characteristics of optical scanning system A used in the optical scanner shown in FIG. 1.
Figure 6B:
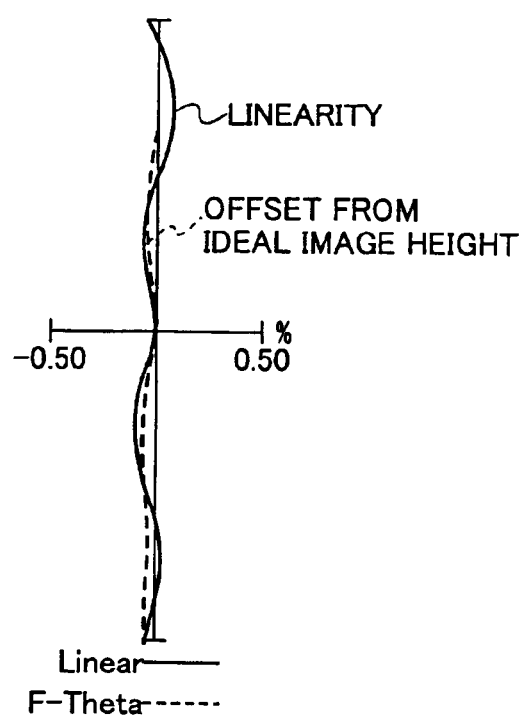
Figure 7A:
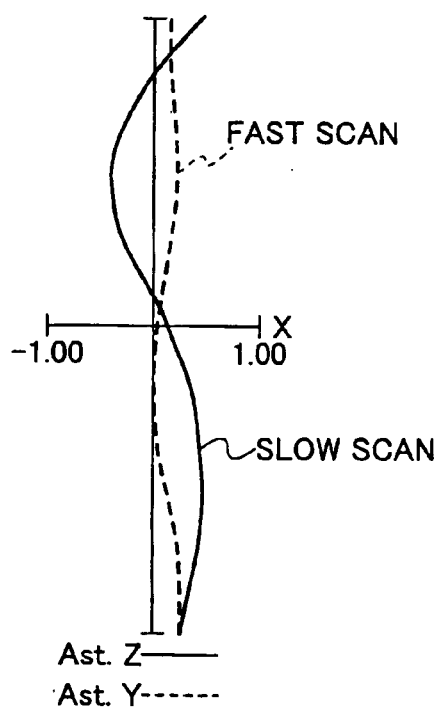
FIG. 7 illustrates the optical characteristics of optical scanning system B used in the optical scanner shown in FIG. 1.
Figure 7B:
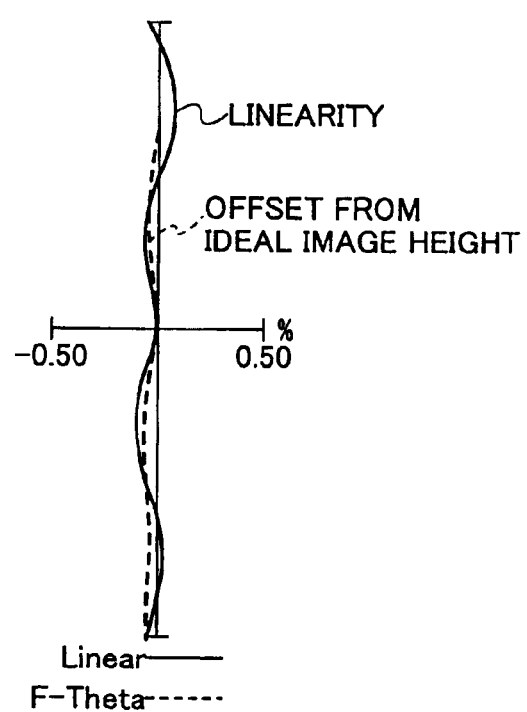

FIG. 6 and FIG. 7 illustrate the optical characteristics of the optical scanning systems A and B, respectively. FIG. 6A and FIG. 7A illustrate the curvature of field, and FIG. 6B and FIG. 7B illustrate the linearity. These characteristics are corrected appropriately, and adverse influence on the performance (such as curvature of field and linearity) due to sag is reduced.

In order to set the beam spot diameter (that is, the width at $1/e^2$ of the maximum intensity) on the scanned plane in the fast scan direction to 50 microns, the diameters of the apertures 11A and 11B in the fast scan direction have to be set to 4.5 mm. In this case, the range in which the beam is deflected by the light deflector 5 without being reduced at the deflecting/reflecting surface is from −171.2 mm to 175.0 mm for scanned plane 9A, and from −172.0 mm to 174.2 mm for scanned plane 9B. The scanning range of the optical scanning system A is on a more positive side.

The available optical scanning range in common between scanned planes 9A and 9B is from −171.2 mm to 174.2 mm.

With this available scanning range, optical scanning along the scanned plane 9A has a margin of 0.8 mm on the writing starting side (that is, the positive side), and optical scanning along the scanned plane 9B has a margin of 0.8 mm on the writing starting side (that is, the negative side).

This arrangement guarantees a sufficient amount of effective writing range in common between the scanned planes 9A and 9B, and in addition, detection areas for placing photo detectors or light-receiving devices can be provided outside the effective writing range, before the writing start positions of the scanned planes 9A and 9B (on the positive side of the writing start position for the optical scanning system A and on the negative side of the writing start position for the optical scanning system B), without increasing the size of the deflecting/reflecting surface of the light deflector 5. Since the light deflector 5 can be maintained compact, undesirable noise and vibration can be prevented. Power consumption and cost can also be maintained low.

Next, an image reproducing apparatus according to an embodiment of the invention is explained.

Figure 8:
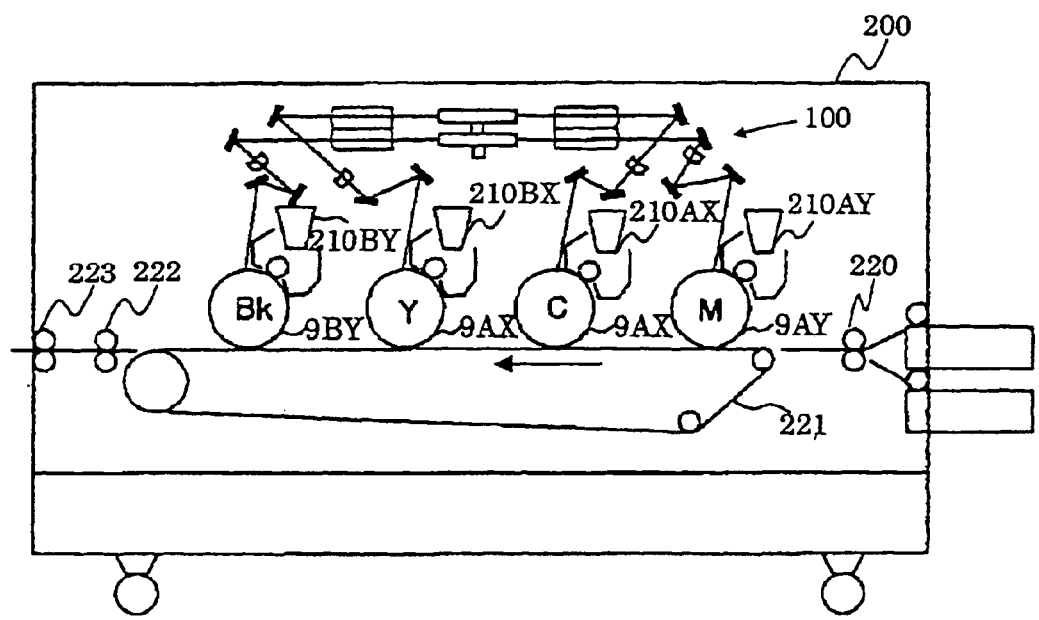
FIG. 8 illustrates the cross-sectional structure of the image reproducing apparatus using the optical scanner according to an embodiment of the invention.

FIG. 8 is a cross-sectional view showing the center of a tandem-type image reproducing apparatus 200, which is suitable for high-speed output of color images, according to an embodiment of the invention.

The image reproducing apparatus 200 has various means for carrying out an electrophotographic process, such as an optical scanner 100, multiple photosensitive units, a developing unit for converting the electrostatic latent image into a visible toner image, a transferring unit for transferring the toner image onto recording paper, etc.

To be more precise, photosensitive drums 9AY, 9AX, 9BX, and 9BY for magenta (M), cyan (C), yellow (Y) and black (B), respectively, are arranged above the transfer belt 221 in this order from the upstream along the moving path of the transfer belt 221. Each of the photosensitive drums rotates in the clockwise direction.

Electrophotographic processing units, such as an electric charger (not shown), a developing unit 210AY, a transfer unit (not shown), etc, are placed around the photosensitive drum 9AY. The optical scanner 100 also carries out an exposure process of the electrophotogrpahic process, and it causes a beam to scan along the surface of the photosensitive drum 9AY uniformly, the photosensitive drum 9AY being electrically charged by the electric charger.

Similarly, a set of electrophotographic processing units are provided for each of the photosensitive drums 9AX, 9BX, and 9BY.

When, for example, a multiple color mode is selected in the tandem-type image reproducing apparatus furnished with multiple photosensitive units, each of the photosensitive units 9AY, 9AX, 9BX, and 9BY is exposed to a scanning beam in response to the imaging signal of the corresponding color, and an electrostatic latent image is formed on each of the photosensitive units 9AY, 9AX, 9BX, and 9BY. The electrostatic latent images are developed with the associated color toners into toner images. The color toner images are then electrostatically attached to the transfer belt 221, and successively transferred onto the transfer sheet (or recording paper) supplied from the paper-supply port 220. In this manner, these color images are superposed onto the sheet, and fixed as a color image by a fixing unit 222. Then, the sheet bearing the reproduced color image is ejected from the paper ejecting port 223.

If a single color mode is selected in the image reproducing apparatus 200, only one photosensitive unit and the associated set of electrophotographic processing units are activated in accordance with the selected color S (one of M, C, Y, and B), and the other photosensitive units and the processing units are not driven.

In this case, an exposure beam is guided onto the photosensitive unit that corresponds to the selected color S, and an electrostatic latent image is formed only on this photosensitive unit. This latent image is developed with the toner of the corresponding color into the toner image. This toner image is electrostatically attached to the transfer belt 221, transferred onto the transfer sheet, and fixed as a single-color image onto the transfer sheet. The transfer sheet bearing the single-color image is then ejected.

Next, the optical scanner 100 used in the image reproducing apparatus 200 is explained below.

Figure 9:
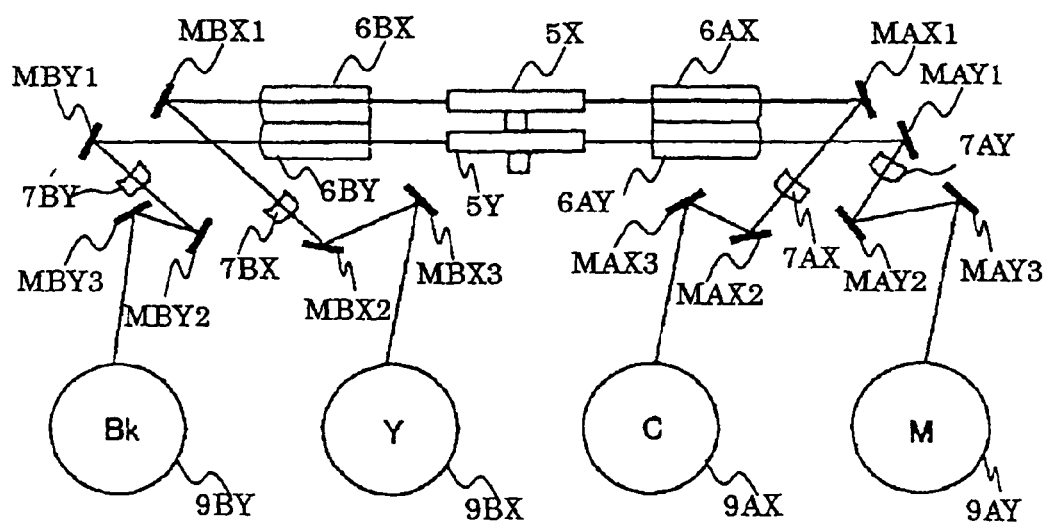
FIG. 9 illustrates the layout of a part of the optical scanner in a cross-sectional view taken along the slow scan plane, showing the light deflector and the subsequent elements.

FIG. 9 illustrates a layout of the light deflector and the subsequent optical components arranged in the scanner 100 in a cross-sectional view taken along the slow scan plane. The optical scanner 4 includes four optical scanning systems AX, AY, BX, and BY. The optical scanning systems AX and BX are arranged on both sides of the light deflector 5X within a plane parallel to the deflecting rotational plane of the light deflector 5X. The optical scanning systems AY and BY are arranged on both sides of the light deflector 5Y within a plane parallel to the deflecting rotational plane of the light deflector 5Y. The optical scanning systems AX and Ay are arranged in the slow scan direction with a prescribed distance between them. Similarly, the optical scanning systems BX and BY are arranged in the slow scan direction with a prescribed distance between them.

The light beam deflected by the light deflector 5X passes through the first scan lens 6AX and the second scan lens 7AX, guided toward the photosensitive unit 9AX, and focused onto the surface (that is, the scanned plane) of the photosensitive unit 9AX, forming a light spot on the scanned plane. The light beam deflected by the light deflector 5X in the opposite direction passes through the first scan lens 6BX and the second scan lens 7BX, guided toward the photosensitive unit 9BX, and focused onto the surface (that is, the scanned plane) of the photosensitive unit 9BX, forming a light spot on the scanned plane.

Similarly, the light beams deflected by the light deflector 5Y pass through the first scan lenses 6AY and 6BY, and the second scan lenses 7AY and 7BY, respectively. These light beams are guided toward the photosensitive unit 9AY and 9BY, and focused onto the scanned planes of the photosensitive units 9AY and 9BY, respectively, forming light spots on these scanned planes.

In FIG. 9, mirrors MAX1 through MAX3, MAY1 through MAY3, MBX1 through MBX3, and MBY1 through MBY3 are used to bend the light paths to guide the deflected light beams onto the associated photosensitive units 9AX, 9AY, 9BX, and 9BY, respectively.

The optical scanner 100 of the image reproducing apparatus 200 also has the features and characteristics explained in conjunction with FIG. 1 through FIG. 7. Accordingly, the output speed can be increased for both a single-color image and a multi-color image, without increasing the rotating speed of the light deflector. In addition, the photo detection areas for placing the light-receiving devices can be provided, while maintaining the effective writing range, without increasing the size of the light deflector. Undesirable color offset in the fast scan direction can also be reduced.

In conclusion, the reference reflecting positions of a pair of optical scanning systems used in an optical scanner are asymmetric with respect to the reference plane, but the scan lenses used in the pair of optical scanning systems are arranged to be symmetric with respect to a line passing through the rotation center of the light deflector and extending parallel to the scanned planes. Consequently, the effective writing range in common between the scanned planes of the pair of optical scanning systems can be maintained, while providing detection areas for accommodating light-receiving devices. Simultaneously, dot offset in the fast scan direction can be reduced.

Since the size of the deflecting/reflecting surface does not have to be increased, adverse influence of a large-sized light deflector, such as increased noise, vibration, power consumption and cost, can be prevented efficiently, while maintaining the scanning rate high.

The scan lens of each of the optical scanning systems is arranged so that the optical axis of the scan lens is located closer to the light source than the reference reflecting position of the associated optical scanning system. Accordingly, adverse influence of sag on the lens performance (such as curvature of field or linearity) can be reduced.

By applying the present invention to a multi-color image reproducing apparatus, a single-color image or a multi-color image can be output at a high rate, without increasing the rotation speed of the light deflector. In addition, the effective writing range can be maintained, while providing detection areas for accommodating the light-receiving devices (or photodetectors). Color offset in the fast scan direction can also be reduced.

This patent application is based on and claims the benefit of the earlier filing date of Japanese Patent Application No. 2002-248130 filed Aug. 28, 2002, the entire contents of which are hereby incorporated by reference.

What is claimed is:

1. An optical scanner comprising a plurality of optical scanning systems with different scanned planes, and a light deflector used in common between said plurality of optical scanning systems, each optical scanning system including a light source for emitting a light beam, a focusing lens for guiding the light beam emitted from the light source onto the light deflector, and a scan lens for focusing the light beam deflected by the light deflector onto the associated scanned plane, wherein:

said plurality of optical scanning systems comprises at least a pair of optical scanning systems arranged on both sides of the light deflector so that a first fast scan direction of one optical scanning system in which a first light beam deflected from the light deflector scans is parallel to a second fast scan direction of the other optical scanning system in which a second light beam deflected from the light deflector scans;

a first reference reflecting position of said one optical scanning system located on the light deflector and a second reference reflecting position of said other optical scanning system located on the light deflector are asymmetric with respect to a reference plane that contains a rotational axis of the light deflector and extends parallel to the first and second fast scan directions; and the scan lens of said one optical scanning system and the scan lens of said other optical scanning system are arranged to be symmetric with respect to a line passing through a rotational center of the light deflector and extending parallel to the scanned planes.

2. The optical scanner according to claim 1, wherein said one optical scanning system has a first writing start position located on the positive image-height side of the optical scanner, and said other optical scanning system has a second writing start position located on the negative image-height side of the optical scanner, and therein the second reference reflecting position is positioned on a more positive side than the first reference reflecting position.

3. The optical scanner according to claim 1, wherein the scan lens of each of said pair of optical scanning systems is arranged so that the optical axis of the scan lens is offset from the associated reference reflecting position in the positive direction.

4. The optical scanner according to claim 2, wherein the scan lens of each of said pair of optical scanning systems is arranged so that the optical axis of the scan lens is offset from the associated reference reflecting position in the positive direction.

5. The optical scanner according to claim 1, wherein the optical scanner has an effective writing range that is in common between said pair of optical scanning systems, each of said pair of optical scanning systems having a detection area outside the effective writing range, the detection area of said one optical scanning system being located on the positive side of a writing start position of said one optical scanning system, and the detection area of said other optical scanning system being located on the negative side of a writing start position of said other optical scanning system.

6. The optical scanner according to claim 5, further comprising a photo detector positioned in the detection area of each of said pair of optical scanning systems.

7. An optical scanner including at least a pair of optical scanning systems and a light deflector used in common between the optical scanning systems, each optical scanning system having a scan lens for guiding the beam deflected from the light deflector onto an associated scanned plane, wherein:

one of said pair of optical scanning systems has a first reference reflecting position on the light deflector, and the other optical scanning system has a second reference reflecting position on the light deflector, the first and second reference reflecting positions being asymmetric with respect to a reference plane that contains a rotational axis of the light deflector and extends parallel to the scanned planes; and the scan lenses of said pair of optical scanning systems are arranged to be symmetric with respect to a line passing through a rotational center of the light deflector and extending parallel to the scanned planes.

8. An image reproducing apparatus comprising multiple photosensitive units and an optical scanner for causing multiple light beams to scan the multiple photosensitive units, wherein:

the optical scanner comprises a plurality of optical scanning systems, each being provided for one of the multiple photosensitive units, and a light deflector used in common between said plurality of optical scanning systems, each optical scanning system including a light source for emitting a light beam, a focusing lens for guiding the light beam emitted from the light source onto the light deflector, and a scan lens for focusing the light beam deflected by the light deflector onto the associated scanned plane;

the plurality of optical scanning systems comprises at least a pair of optical scanning systems arranged on both sides of the light deflector so that a first fast scan direction of one optical scanning system in which a first light beam deflected from the light deflector scans is parallel to a second fast scan direction of the other optical scanning system in which a second light beam deflected from the light deflector scans;

a first reference reflecting position of said one optical scanning system located on the light deflector and a second reference reflecting position of said other optical scanning system located on the light deflector are asymmetric with respect to a reference plane that contains a rotational axis of the light deflector and extends parallel to the first and second fast scan directions; and the scan lens of said one optical scanning system and the scan lens of said other optical scanning system are arranged to be symmetric with respect to a line passing through a rotational center of the light deflector and extending in parallel to the scanned planes.

9. The image reproducing apparatus according to claim 8, wherein the multiple photosensitive units are provided corresponding to multiple colors for forming a color image on a recording medium.

* * * * *